No. 609,043. Patented Aug. 16, 1898.
C. O. PALMER.
MOTOR CAR.
(Application filed Apr. 18, 1894. Renewed Jan. 25, 1898.)
(No Model.) 3 Sheets—Sheet 1.

Witnesses
Inventor
Charles Otis Palmer

No. 609,043. Patented Aug. 16, 1898.
C. O. PALMER.
MOTOR CAR.
(Application filed Apr. 18, 1894. Renewed Jan. 25, 1898.)

(No Model.) 3 Sheets—Sheet 2.

Witnesses:
Inventor
Charles Otis Palmer.

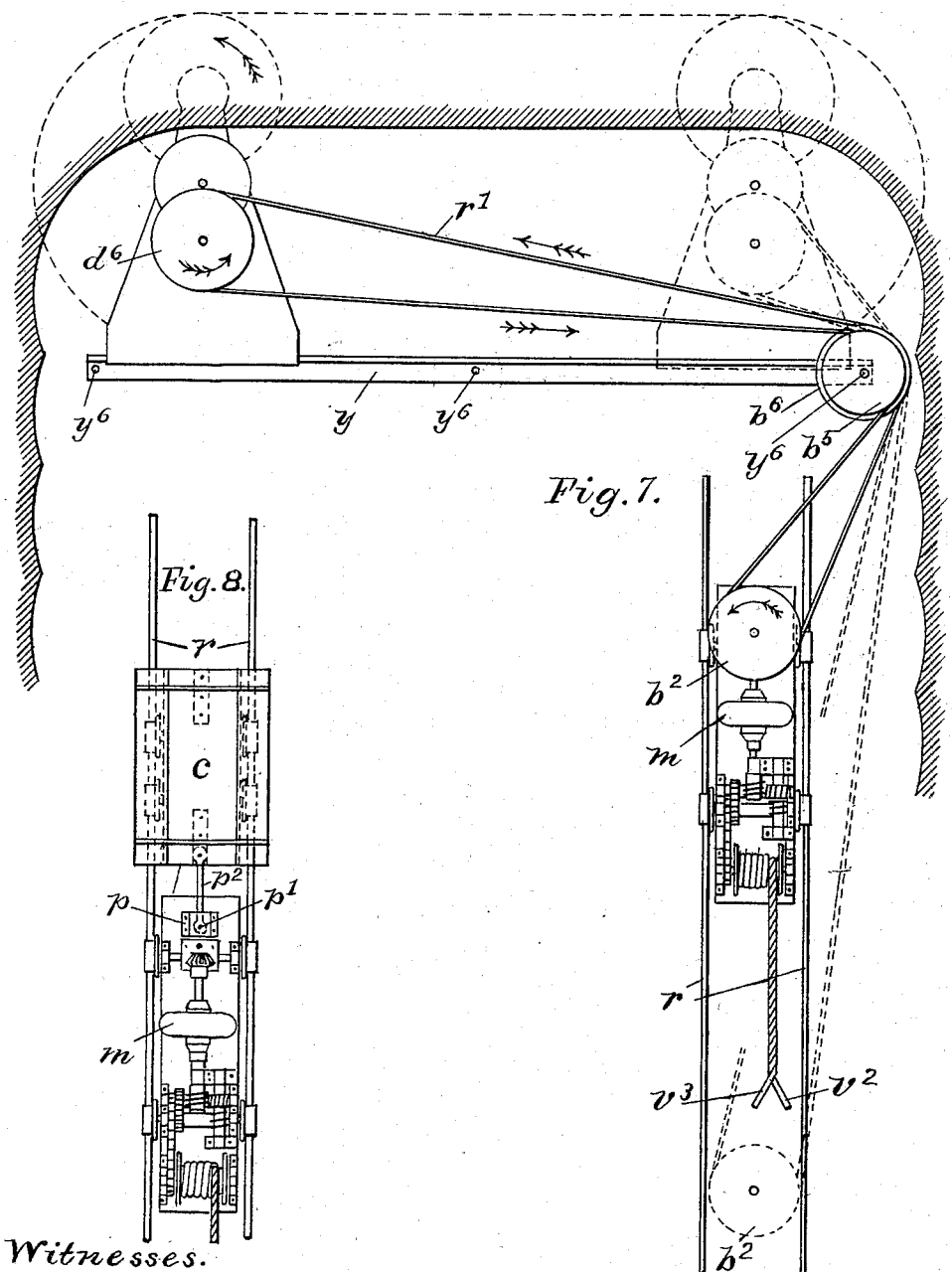

UNITED STATES PATENT OFFICE.

CHARLES OTIS PALMER, OF CLEVELAND, OHIO.

MOTOR-CAR.

SPECIFICATION forming part of Letters Patent No. 609,043, dated August 16, 1898.

Application filed April 18, 1894. Renewed January 25, 1898. Serial No. 667,933. (No model.)

*To all whom it may concern:*

Be it known that I, CHARLES OTIS PALMER, a citizen of the United States, residing at Cleveland, in the county of Cuyahoga and State of Ohio, have invented certain new and useful Improvements in Motor-Cars, of which the following is a specification.

My invention relates to improvements in motor-cars used for carrying goods, hauling cars, and furnishing power to movable machines.

My improvements consist in means for automatically maintaining a uniform tension of the driving-rope notwithstanding the driven pulley is being moved at the same time the power is being transmitted; in automatically taking up and paying out the flexible conductor as the car moves from place to place; in automatically keeping a uniform tension on the flexible conductor, so as to prevent undue strains in it while the motor is moving about; in mechanism for applying the power of the motor for its own locomotion while being used for transportation or other purposes, and in various other improvements hereinafter described, and pointed out in the claims.

Figure 1:
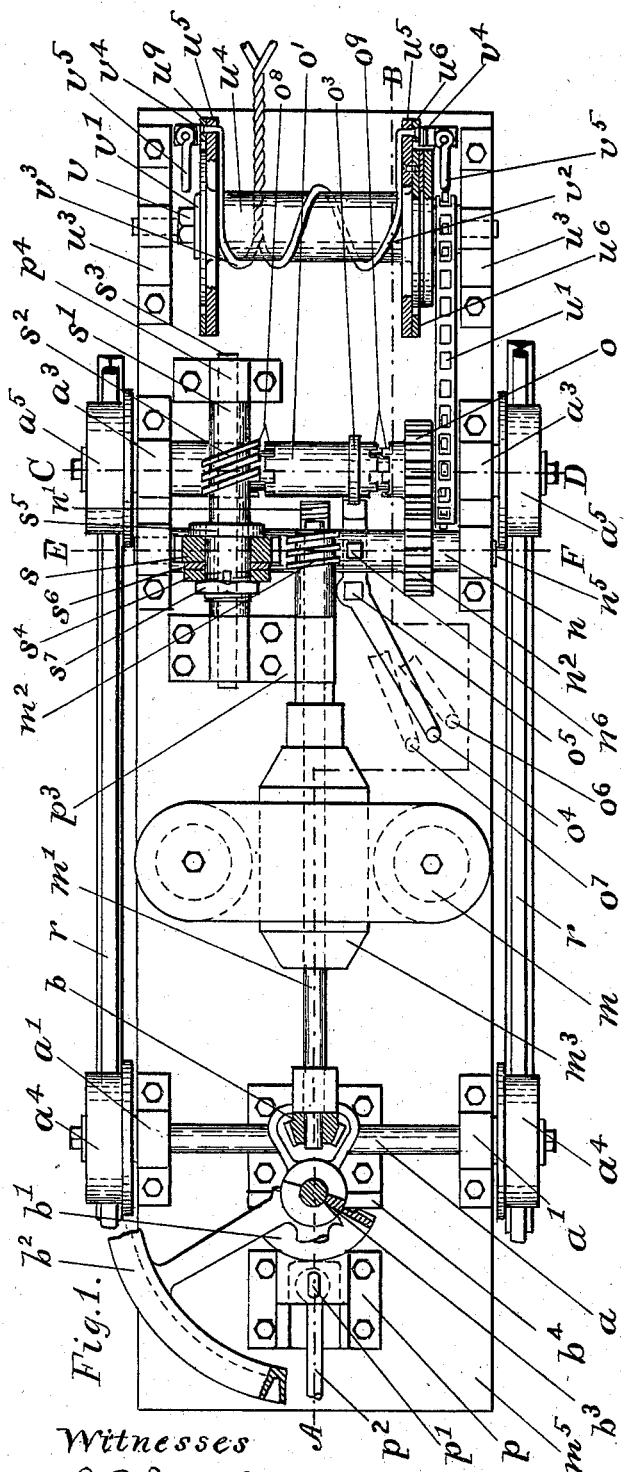
Figure 2:
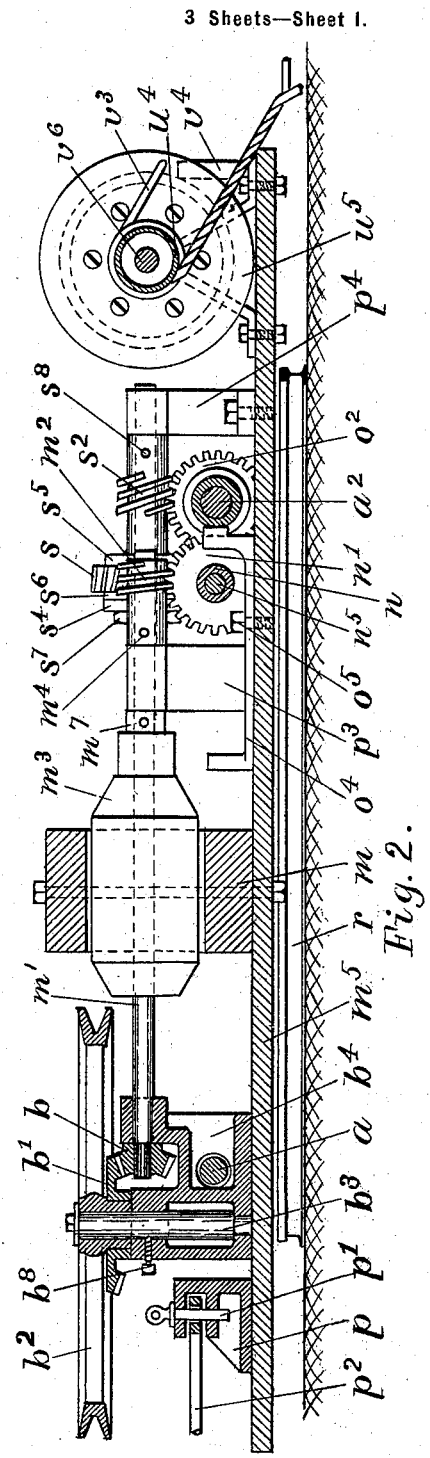
Figure 3:
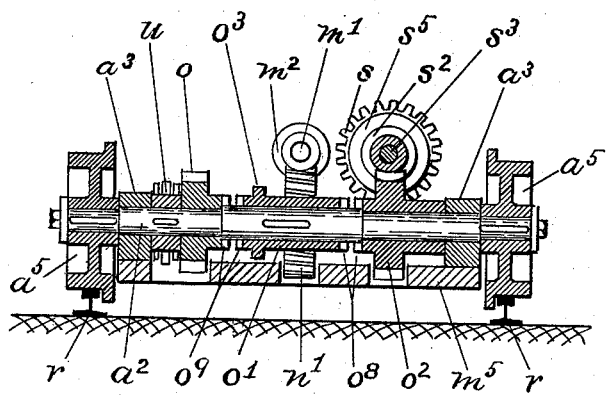
Figure 4:
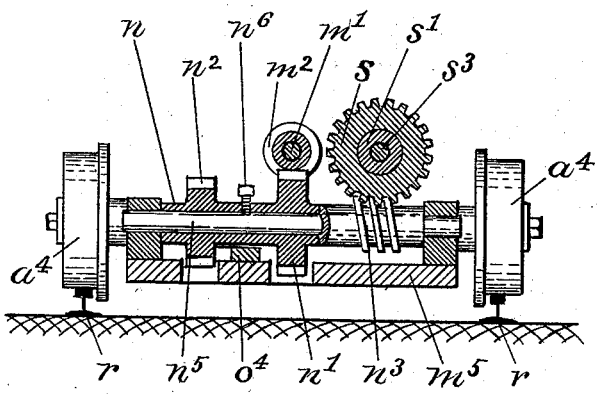
Figures 5, 6:
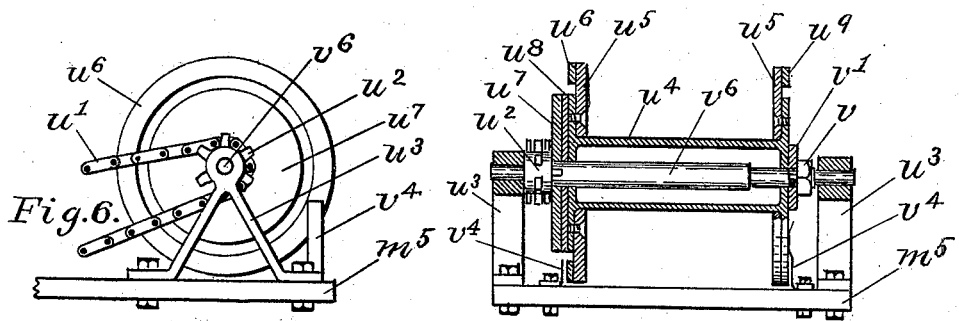

In the drawings accompanying and forming a part of this specification, Figure 1 is a plan of my improved motor-car with part of the rope-driving wheel and bevel driving-gear broken away. Fig. 2 is a vertical section on line A B, Fig. 1. Fig. 3 is a vertical section on line C D, Fig. 1. Fig. 4 is a vertical section on line E F, Fig. 1. Fig. 5 is an end view with part of conveyer-reel broken away. Fig. 6 is a side view of the conveyer-reel. Fig. 7 is a plan of the room of a mine, illustrating the mode of operating the motor when driving a mining-machine of the wheel type. Fig. 8 is a top view showing the motor-car with mine-car attached, as in transportation service.

The car-frame consists of a frame or platform $m^5$, to which are bolted the forward-axle brackets $a'$ and the rear-axle brackets $a^3$. Through the bearings $a'$ passes the forward axle $a$ and through the brackets $a^3$ passes the rear axle $a^2$. To the foward axle $a$ are keyed the forward track-wheels $a^4$ and to the rear axle $a^2$ are keyed the rear track-wheels $a^5$. The said track-wheels $a^4$ $a^5$ run on the mine-track $r$ and are provided with flanges to prevent their leaving the track.

Near the middle of platform $m^5$ is fastened a motor, preferably an electric motor, although a compressed-air or other kind of motor will answer the same purpose. The shaft of said motor lies somewhat above and runs longitudinally of said platform $m^5$, and bolted on the forward end of the platform is the driving-pulley bracket $b^4$, having a bearing in the top for the motor-shaft $m'$. Standing vertically in pulley-bracket $b^4$ is the driving-pulley stud $b^3$, which is held in place by the set-screw $b^8$. The bevel driving-gear $b'$ and driving-pulley $b^2$ are keyed or otherwise fastened together, and the driving-pulley $b^2$ is kept on its stud $b^3$ by a bolt and washer on its upper end. The bevel driving-pinion $b$ is also keyed to the motor-shaft $m'$. Keyed to the motor-shaft $m'$ is the motor-armature $m^3$, from which it derives its motion in the ordinary manner. The motion of shaft $m'$ is transmitted through the bevel-pinion $b$ to the bevel-gear $b'$ and to the driving-pulley $b^2$. In the groove of pulley $b^2$ runs the driving-rope $r'$, as will be explained hereinafter.

The rear end of the motor-shaft $m'$ revolves in its bearing in the bracket $p^3$ and is prevented from longitudinal motion in one direction by the motor-worm $m^2$, to which it is fastened by the pin $m^4$ and in the other direction by the collar $m^7$, which is pinned or otherwise secured to shaft $m'$, adjacent to bracket $p^3$.

Formed on the hollow shaft, which is designated in a general way by $n$ and engaging with the worm $m^2$, is the worm-wheel $n'$, and formed on one end of the shaft $n$ is the pinion $n^2$ and on the other the worm $n^3$. Running through the center of the said hollow shaft $n$ and bearings at the ends thereof is the internal shaft $n^5$, which is fastened in the shaft $n$ by a set-screw $n^6$. Engaging with pinion $n^2$ is gear $o$, which revolves on the rear axle $a^2$, and has clutch-teeth on its side which engage with similar teeth on the end of the sliding sleeve $o'$ and form clutch $o^9$. The gear $o$ is prevented from sliding on its axle into contact with the sleeve $o'$ by a shoulder on the axle $a^2$, as shown in Fig. 3.

Engaging with the worm $n^3$ is worm-wheel $s$, which revolves on the hollow shaft $s'$ between flange $s^5$ on one side and the leather washer $s^6$ on the other. Surrounding shaft $s'$ on the forward side of worm-wheel $s$ and splined to it is the friction-disk $s^4$. Threaded on shaft $s'$ is nut $s^7$, which presses the leather washer $s^6$ against the worm-wheel $s$, producing thereby the desired friction, and thus regulating the amount of force which is transmitted from the worm-wheel $s$ to shaft $s'$, as will be hereinafter referred to.

The hollow shaft $s'$, with the worm $s^2$ formed on its end, has the internal shaft $s^3$ running through its center and through bearings in the brackets $p^3$ and $p^4$ on its ends. Engaging with worm $s^2$ is worm-wheel $o^2$, which revolves on the rear axle $a^2$ and has on its side clutch-teeth that engage with similar teeth on the sliding sleeve $o'$, thereby forming clutch $o^8$. Worm-gear $o^2$ is prevented from sliding on its axle into engagement with the sleeve $o'$ by a shoulder on shaft $a^2$, as shown in Fig. 3. The sleeve $o'$ is splined to and slides longitudinally on the axle $a^2$, and its flange $o^3$ runs in the groove on the clutch-lever $o^4$. The said clutch-lever $o^4$, which is pivoted in the middle on the screw $o^5$, can be moved by hand to the dotted position $o^6$, thus throwing into engagement the clutch $o^8$, or to the dotted position $o^7$, which brings the clutch $o^9$ into engagement. When the said clutch-lever $o^4$ is in mid-position, as shown in solid lines, the sleeve $o'$ is in mid-position and both clutches $o^8$ and $o^9$ are out of engagement and the axle $a^2$ is free to revolve irrespective of the revolving gears $o$ and $o^2$, that are journaled upon it. When in this position, the motor-car is free to be moved by hand on the track irrespective of whether the motor $m$ is running or not. When clutch $o^9$ is in engagement, the motion of the motor-shaft $m'$ is transmitted, through the worm $m^2$ and worm-wheel $n'$, situated on the intermediate shaft $n$, to the spur-pinion $n^2$, meshing into gear $o$ on the rear axle $a^2$. From thence it is transmitted through clutch $o^9$ to the sleeve $o'$, which being splined to axle $a^2$ turns the wheels $a^5$ and produces thereby a corresponding motion of the car on its track $r$. It will thus be seen that the revolutions of the motor-shaft $m'$ are communicated by two different paths to the wheels $a^5$, one by gear $o$ and clutch $o^9$ and the other by gear $o^2$ and clutch $o^8$.

By the mechanism just described the gears $o$ and $o^2$ have very different speeds, so that engagement with gear $o$ causes the motor-car to advance at a speed suitable for moving cars of any description from place to place, while engagement with gear $o^2$ causes the motor to travel at a speed more nearly corresponding to the feed or cutting movement of the mining-machine when in use, as will be hereinafter referred to.

Keyed to shaft $a^2$ and revolving with it is the sprocket-wheel $u$, around which passes a sprocket-chain $u'$, which communicates motion to the sprocket-pinion $u^2$ and reel-shaft $v^6$, on which it is shrunk or otherwise firmly fastened. The reel-shaft $v^6$ is revolubly supported at each end in bearings in the reel-supporting brackets $u^3$, which are bolted to the platform $m^5$. When, however, clutch $o^8$ is thrown into engagement, the motion of the motor-shaft $m'$ is communicated to the intermediate shaft $n^5$, as before, and from it through the intermediate worm to the friction worm-wheel $s$ on the friction-shaft $s^3$ and through the friction-washer $s^6$ and disk $s^4$, which is splined to shaft $s'$, and from it through worm $s^2$ to worm-wheel $o^2$ on the rear axle $a^2$. The clutch $o^8$ being in engagement, the motion is communicated through it to the sliding sleeve $o'$, and from thence through the rear axle $a^2$ to the rear wheels $a^5$, producing a corresponding motion along track $r$.

Journaled on shaft $v^6$ is the conveyer-reel $u^4$ with flanged ends, to which are screwed the reel-disks $u^5$, made of wood or other electrical insulating material. Secured to the side of the outer edge of reel-disks $u^5$ are the metal brush-rings $u^6$.

Keyed to the reel-shaft $v^6$ by the side of sprocket-wheel $u^2$ is the reel friction-disk $u^7$, and between said friction-disk $u^7$ and the flange of drum $u^4$ is the leather washer $u^8$. The desired friction between the flange of reel $u^4$ and friction-disk $u^7$ is obtained by tightening the nut $v$ against its washer $v'$. The washer $v'$ is kept from turning by being splined to shaft $v^6$. The insulated electric wires $v^2$ and $v^3$ for conveying the electricity to and from the motor are wound on the reel $u^4$, the end of the wire $v^2$ terminating in the brush-ring $u^6$ on one end of the conveyer-reel and the end of the wire $v^3$ terminating in the other brush-ring $u^9$ on the right end of the conveyer-reel. The other ends of the wires $v^2$ $v^3$ are attached to binding-posts in proper electrical connection with the terminals of a dynamo. From these brush-rings $u^6$ and $u^9$ the current is carried to the brushes $v^4$ and from said brushes is led by the wires $v^5$ to the binding-posts of the motor $m$.

Attached to the front end of the truck-platform by screws, as shown, is the draw-head $p$, in which is held the coupling-bar $p^2$ by the coupling-pin $p'$. To the other end of the coupling-bar $p^2$ is coupled the car C or mining-machine, as indicated in Fig. 8, or whatever it is desired to transport with the motor-car.

The wires $v^2$ $v^3$ being connected to binding-posts at a distance which are in circuit with a dynamo, the operator now couples the motor-car and train together and by closing an electric switch completes the circuit through the electric motor $m$. The motor-shaft $m'$ starts, and as the clutch-lever $o^4$ is in the dotted position $o^7$ the clutch $o^9$ is in engagement and the motion of the shaft $m'$ is transmitted, as before explained, through the gear $o$ to the truck-wheels $a^5$, and the motor travels on its track. The direction of travel of the motor-car is governed by the direction of revolution of the armature $m^3$, which depends on the direction in which the electricity traverses the motor. The direction of the electric current is regulated by an electric switch well known for that purpose.

Supposing now the motor-car to advance forward, pushing its train before it, then the revolution of the rear wheels is communicated through the sprocket-chain $u'$ to the reel friction-disk $u^7$ and by friction through the leather washer $u^8$ to the conveyer-reel $u^4$, which unwinds or pays out the electric wires $v^2$ $v^3$ at a speed depending on the size of the sprocket-wheels and on the amount of wire wound on the conveyer-reel. If paid out too slowly, the wires $v^2$ $v^3$ are tightened to a degree depending on the amount of friction transmitted through the friction-disk $u^8$, which, as before stated, is regulated by the nut $v$ and need never be sufficient to stretch the electric wires $v^2$ $v^3$ more than the required amount. On the other hand, should the wire be paid out faster than the motor-car moves and the wires become tangled on the floor they may be wound up by turning the reel by hand against the friction and winding up the slack wires.

Having run the motor-car, with its mining-machine coupled thereto, in the same manner as the mine-car in Fig. 8 into the mine-room up near the working breast, the electric current is stopped, the motor-car is disconnected, and the mining-machine is set up at the left-hand side of the room in Fig. 7. The driving-rope $r'$ is reeled on the motor driving-pulley $b^2$, the idler-wheels $b^5$ and $b^6$, and the mining-machine driving-pulley $d^6$ in the manner shown in Fig. 7.

The clutch-lever $o^4$ is now moved to the dotted position $o^6$, thus engaging clutch $o^8$, and the motor is started. The power both for feeding and cutting is transmitted to the mining-machine by the rope $r'$, and the machine advances to its work from the position shown by solid lines on the left-hand side of the room to the position shown in dotted lines on the right-hand side of the room, the motor driving-wheel having changed in the meantime to the position shown in dotted lines at the bottom of the sheet. This movement of the machine across the room slackens the driving-rope, and it is to preserve a uniform tension of this that the slow automatic translation of the motor is effected.

Owing to the obliquity of the driving-rope the motor movement is not uniformly as fast as the mining-machine. The motor is geared to move slightly faster than the feed of the mining-machine across the room, so as to take up all the slack of the driving-rope and somewhat more—that is, the driving-rope is given an initial tension sufficient for driving purposes by tightening the nut $s^7$ on shaft $s'$, which, as before stated, regulates the amount of friction, and therefore of power, that passes from the worm-wheel $s$ to its shaft $s'$ and so to the wheels $a^5$, so that when this tension of the rope $r'$ exceeds the tension necessary for driving the mining-machine the friction-clutch slips. If the friction-clutch beside gear $s$ was dispensed with and the gear keyed to its shaft $s'$, the pull on the driving-rope would only be limited by the traction of the wheels $a^5$ on the rails $r$. The traction of the wheels, however, depends on the inclination of the rails and on the condition of the track, all of which are liable to variation and not capable of the uniform tension given by adjustable friction.

A closer adjustment of the friction-clutches may be obtained by the well-known method of placing a spiral compression-spring between nut $v$ and its washer $v'$ and between nut $s^7$ and its disk $s^4$. The diameter of the rope-pulleys may be somewhat reduced by increasing the number of wrappings and using a smaller rope.

I have shown the driving-pulley as continually in driving connection with the motor-shaft; but any well-known method may be used to throw it out of gear when not in use. The electric motor itself is not described, as any reversible motor may be used for the purpose. The operation of the motor is not restricted to the use of the reel, but wherever there is a trolley-wire the reel may be dispensed with and a trolley used to convey the electricity from the trolley-wire to the binding-posts of the motor in the ordinary manner. I have here shown two wires, one for conveying the electricity to the motor and the other to return it to the dynamo. When, however, we can complete the return-circuit through the ground or by means of the rails, as is often done, the return-wire with its conveyer-reel connections can be dispensed with, thus simplifying the reel and allowing double the length of direct wire to be wound on the same.

Although this motor-car is adapted to other kinds of mining-machines, it is specially useful for the class that feeds along the working breast as it may be of any suitable form well known to the art and does not form part of this application. Feeding the mining-machine across the working breast is not here described.

Besides furnishing power for mining or other movable machines the motor-car is intended for gathering the loaded mine-cars from the different rooms where the ceilings are usually too low to admit donkeys and also for distributing the empty cars for reloading, as shown in Fig. 8. It can also be used in other places for the transportation of any merchandise, especially in places where no trolley-wire is strung. By using a disk form of friction on the end of the reel very little dirt can get onto the friction-surfaces, nor are they liable to injury by contact with obstructions on the floor.

Having thus described my invention, what I claim as new, and desire to secure by Letters Patent, is—

1. The combination of the car-frame mounted on wheels and supporting a motor thereon, a driving-wheel in operative connection with the motor, a frictionally-connected driving-train from the motor to the car-wheels, together with a conductor from the motor to the dynamo, or other source of energy, and a flexible-band connection from the driving-wheel to the mining-machine, substantially as described.

2. The combination of a car-frame mounted on wheels and supporting a motor thereon, a driving-train consisting of the worm $m^2$ on the motor-shaft $m'$, worm-wheel $n'$ and worm $n^3$ on shaft $n$, worm-wheel $s$ and worm $s^2$ on shaft $s'$, worm-wheel $o^2$ on axle $a^2$, clutch $o^8$ and sleeve $o'$, splined to said axle, a driving-wheel $b^2$, gear-wheel $b'$ on said horizontal driving-wheel and engaging with motor-gear $b$, and a flexible band connecting the driving-wheel with the driven wheel on the mining-machine, substantially as and for the purpose described.

3. A motor-car frame supported on wheels, a motor mounted on said frame and driving a pulley-wheel, a worm on the motor-shaft, a worm-wheel on the intermediate shaft and in engagement with said motor-shaft worm, a worm on said intermediate shaft engaging with the worm-wheel on the friction-shaft, a friction-clutch associated with said friction-shaft, a worm on the friction-shaft engaging with a worm on the car-axle, all combined and operated substantially as described.

4. The combination of a car-frame supported on wheels and having a motor mounted thereon, a sprocket-wheel on one of the wheel-axles, a reel-shaft journaled in bearings on said car-frame, a sprocket-wheel fixed on said reel-shaft, a reel journaled on said reel-shaft, a friction-clutch on the side of said reel in train from said reel-shaft to the reel, a sprocket-chain connecting said sprocket-wheels, a flexible conductor wound on said reel and conductor connections from the reel to the motor, substantially as shown.

5. The combination of a car-platform supported on wheels and having a motor and reel attached thereto, a flexible conductor wound on said reel, conductor connections from the reel to the motor, and a friction-controlled driving connection from a car-axle to the reel substantially as and for the purpose set forth.

6. The combination of a car, a motor, a driving-wheel driven by said motor, a friction-controlled driving connection from said motor to the car-axle, a reel and a flexible conductor wound on said reel and connected with both the motor and a dynamo, engine, or other source of energy, together with a mining-machine, a horizontal pulley on said mining-machine, and a flexible-band connection between the mining-machine pulley and the motor-pulley, substantially as described.

7. A car-truck with a motor mounted thereon, a reel on one end of the truck, a worm on the motor-shaft engaging a worm-wheel on the intermediate shaft, a gear on said intermediate shaft engaging with a gear-wheel on a wheel-axle, a sleeve splined to the said wheel-axle in driving engagement with said axle-gear, means for engaging and disengaging said sleeve, a conductor-reel, a conductor wound on said reel and in connection with a dynamo, engine, or other source of energy, and the motor on the car-truck, combined substantially as described.

8. In a motor-car, a car-frame mounted on wheels and supporting an electric motor, a worm $m^2$ on the motor-shaft engaging worm-wheel $n'$ on the intermediate shaft $n$, a train of gearing consisting of pinion $n^2$ and gear $o$, a train of gearing consisting of worm $n^3$ worm-wheel $s$, worm $s^2$ and worm-wheel $o^2$, and a double clutch for engaging either gear $o$ or the worm-wheel $o^2$ with the car-wheel, combined substantially as and for the purpose described.

CHARLES OTIS PALMER.

Witnesses:
ALBERT E. LYNCH,
WARD HOOVER.